Sept. 29, 1925.   1,555,599
O. A. ONTIVEROS
DRIVING WHEEL
Filed May 29, 1924
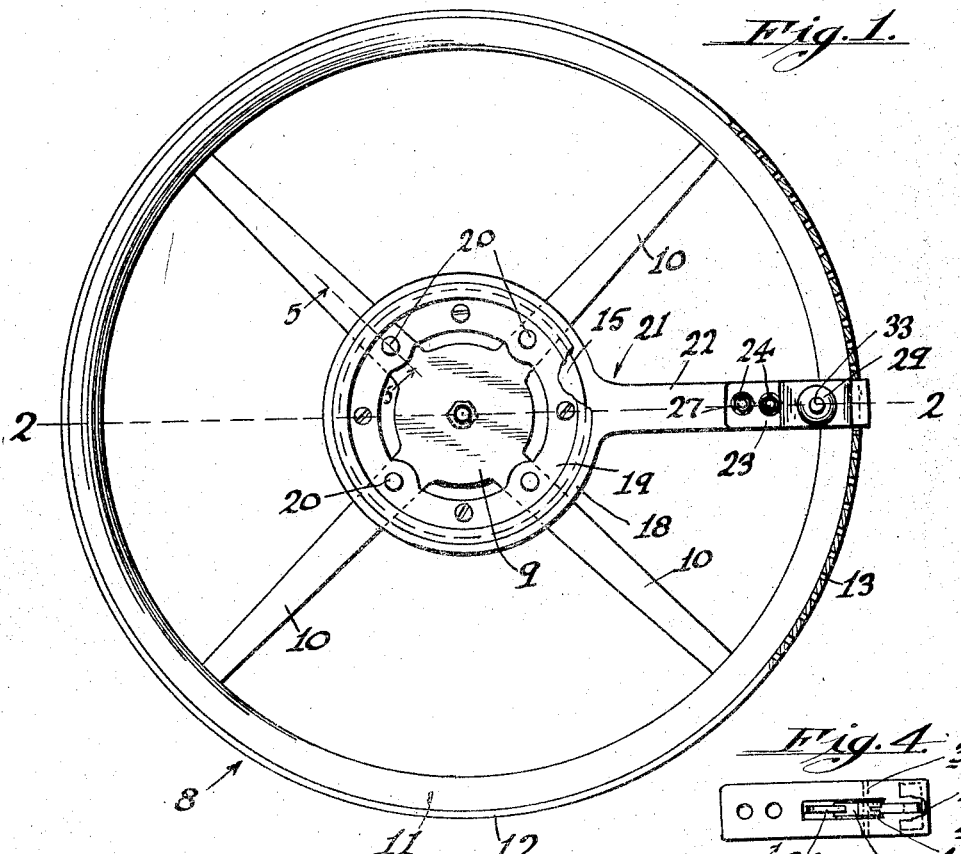
Fig. 1.
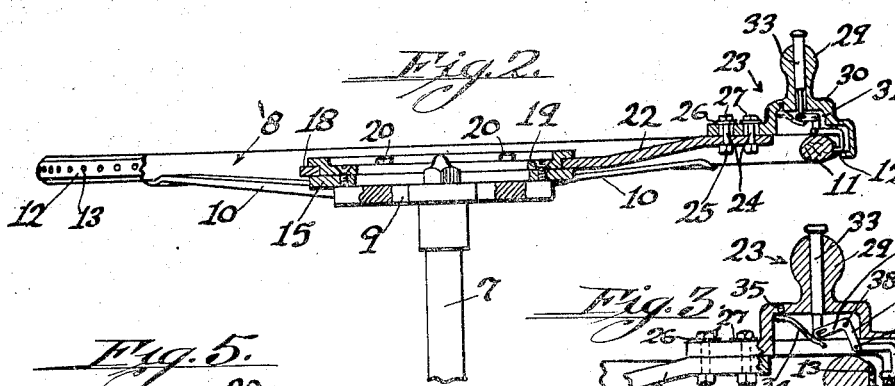
Fig. 2.
Fig. 4.
Fig. 5.
Fig. 3.
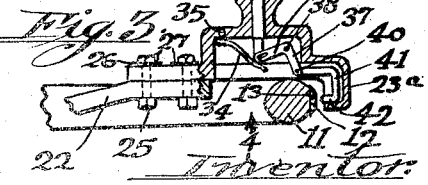
Inventor:
OZELL A. ONTIVEROS.
BY Hazard and Miller
Attorneys
Witness:

Patented Sept. 29, 1925.

1,555,599

UNITED STATES PATENT OFFICE.

OZELL A. ONTIVEROS, OF LOS ANGELES, CALIFORNIA.

DRIVING WHEEL.

Application filed May 29, 1924. Serial No. 716,708.

*To all whom it may concern:*

Be it known that I, OZELL A. ONTIVEROS, a citizen of the United States, residing at Los Angeles, in the county of Los Angeles and State of California, have invented new and useful Improvements in Driving Wheels, of which the following is a specification.

This invention relates to attachments for steering wheels of motor vehicles, and it has for one of its objects the provision of such attachment whereby the steering wheel may be more easily turned.

With heavy trucks especially, the driver usually requires both hands to turn the steering wheel when turning a corner, but at the same time should have one hand free to give the turning signal. It is therefore an object of this invention to provide means by which only one hand is required to turn the driving wheel and this is accomplished by providing a lever which may be readily grasped and adapting such lever to be positioned in the most advantageous manner so that a push or a pull on the lever with one hand will be sufficient to turn the automobile around a corner.

With the foregoing objects in view, together with such other objects and advantages as may subsequently appear, this invention consists in the construction and arrangement of parts hereinafter described and claimed and illustrated in the accompanying drawings, in which:

Figure 1 is a plan view of a steering wheel with an embodiment of my invention attached thereto, Fig. 2 is a longitudinal section taken on the line 2—2 of Fig. 1, and showing a lever employed in my device locked to the wheel, Fig. 3 is an enlarged fragmentary detail of the lever shown in Fig. 2, this view showing the lever unlocked from the wheel, Fig. 4 is a view taken in the direction of the arrow 4 of Fig. 3, and Fig. 5 is a section taken on the line 5—5 of Fig. 1.

Referring to the drawings for a more detailed description thereof, the numeral 7 indicates a steering post to which is secured a driving wheel 8 comprising a nave 9, radial arms or spokes 10 and a rim 11. To the periphery of the rim 11 is secured a band 12 extending entirely around the wheel and having a plurality of perforations or apertures 13 at regular intervals.

An annular plate 15 is secured to the spokes 10 by bolts 16 having nuts 17 on their lower ends. An annular plate 18 rests on the plate 15 near the edge of the latter and is held by an annular plate 19 superimposed on the plate 15 and on the plate 18. The annular plate 19 is secured to the plate 15 by the bolts 16 which are provided at their upper ends with nuts 20. The plate 18 is fitted between the plates 15 and 19 with a working fit so that it may be rotated relative to the plates 15 and 19, and therefore relatively to, or independently of, the wheel 8.

The plate 18 is part of a lever 21 which comprises a radial arm 22. An extension 23 is adjustably secured, and radially so, to the arm 22 by means of bolts 24 provided at their lower ends with nuts 25 and at their upper ends with washers 26 and nuts 27. The extension 23 is radially adjustable to allow the lever to be fitted to wheels of different radii. The extension 23 comprises an upright knob 29, rising from a portion 30 of the extension. The portion 30 is formed to provide a space 31 between it and the upper edge of the rim. The knob 29 is perforated axially to receive a pin 33 which passes through the portion 30 of the extension into the space 31. The lower end of the pin 33 rests against a spring 34 secured to the lower face of the portion 30 by means of a screw 35.

A bell crank lever 37 is pivotally mounted at 38 and comprises an arm 39, the free end portion of which is provided with a slot engaged by a pin secured to the lower end of the pin 33 and extending at right angles thereto. The other end of the bell crank lever 37 is pivotally connected at 40 to a member 41 comprising an inwardly turned section 42 which normally engages a perforation or aperture 13 in the peripheral band 12. The section or portion 42 of the member 41 is normally kept in engagement with an aperture 13 by the action of the spring 34, as shown in Fig. 2; and it will be readily seen that when in this position the lever 21 is locked to the driving wheel and that the latter may be turned by a force supplied to the knob 29.

When the pin 33 is pressed downwardly, as shown in Fig. 3, the section or portion 42 is moved out of engagement with the peripheral band 12, leaving the lever 21 free to be rotated to any point on the periphery of the wheel. The member 41 is enclosed by a portion 23ª of the extension 23 and works in a groove formed therein.

When the driver of a motor vehicle is running straight, the lever 21 may be unlocked from the wheel and set in that position from which the wheel may be most easily turned for the next contemplated turn. When turning, the knob of the lever may be readily grasped with one hand while the turning signal is given with the other.

I have thus provided the combination with the driving wheel of a motor vehicle of a lever rotatable independently of the driving wheel and adapted to be locked to the same whereby the wheel may be turned.

This invention has been described but modifications thereof may be devised without departing from the spirit thereof, and it is to be understood that such modifications come within the scope of this invention.

What is claimed is:

1. The combination with the driving wheel of an automobile, of a lever rotatable independently of the driving wheel and adapted to be locked to said wheel whereby said wheel may be turned.

2. The combination with a driving wheel of an automobile of a handle, means to slide the handle around the rim of the wheel, a pin extending through the handle, and a locking mechanism operated by the pin adapted to engage the rim and lock the handle in any desired position.

3. The combination with the driving wheel of a motor vehicle, of a lever rotatable independently of the driving wheel, and means for normally locking said lever to said wheel, said means being adapted to be unlocked by pressure of the hand.

4. The combination with a driving wheel of a motor vehicle, of a lever pivotally mounted on said wheel, and means for locking said lever to said wheel, said lever being adjustable radially of the wheel.

5. In combination, a driving wheel, a perforated band secured to the periphery of said wheel, and extending therearound, a lever mounted on said wheel and rotatable relative thereto and radially adjustable relative to said wheel, means mounted on said lever for normally engaging the perforations of said band, one at a time, to lock the lever to said wheel, and means for disengaging the locking means, said lever comprising a knob adjacent its free end.

6. In combination, a driving wheel, a perforated band secured to the periphery of said wheel and extending therearound, a lever mounted on said wheel and rotatable relative thereto and radially adjustable relative to said wheel, means mounted on said lever for normally engaging the perforations of said band, one at a time, to lock the lever to said wheel, and means for disengaging the locking means, said lever comprising a knob adjacent its free end, said disengaging means comprising a pin extending through said knob axially.

In testimony whereof I have signed my name to this specification.

OZELL A. ONTIVEROS.